United States Patent [19]
Giatti

[11] 3,771,639
[45] Nov. 13, 1973

[54] DEVICE FOR THE CONTINUOUS HANDLING OF RODLIKE ARTICLES PARTICULAR CIGARETTES PERFECTLY ALIGNED IN ROWS

[75] Inventor: Filippo Giatti, Bologna, Italy

[73] Assignee: AMF Incorporated, White Plains, N.Y.

[22] Filed: Sept. 7, 1972

[21] Appl. No.: 286,850

[30] Foreign Application Priority Data
Sept. 11, 1971 Italy .............................. 12914 A/71

[52] U.S. Cl. .................................. 198/25, 198/210
[51] Int. Cl. ............................................. B65g 47/26
[58] Field of Search ..................... 198/20 C, 25, 32, 198/210; 131/25, 94; 214/1 BV, 1 BS, 1 BH

[56] References Cited
UNITED STATES PATENTS
3,563,377  2/1971  Southcott ............................ 198/25

*Primary Examiner*—Edward A. Sroka
*Attorney*—George W. Price

[57] ABSTRACT

A rotatable device for automatically transferring an aligned row of rod-like articles moving along a first pre-set path to a second pre-set path off-set from the first path.

6 Claims, 3 Drawing Figures

DEVICE FOR THE CONTINUOUS HANDLING OF RODLIKE ARTICLES PARTICULAR CIGARETTES PERFECTLY ALIGNED IN ROWS

This invention relates generally to a conveyor system for one or more rows of aligned rod-like articles such as cigarettes and more particularly to a rotatable device for automatically transferring such articles moving along a first pre-set path on a conveyor to another conveyor for movement along another pre-set path offset from the first path.

A typical example of the foregoing which the present invention is particularly adapted for is a continuous making system for the application of filters to cigarettes and for packing the completed articles.

Cigarettes are usually aligned in rows on a movable fluted conveyor which could be a drum or a continuous articulated chain or belt conveyor or the like. During the process of making the cigarettes, all or part of the cigarettes of one of such rows may have to be transferred from one conveyor to another forming another moving row having a different orientation and lying in a different plane than the original row. In another instance, two rows of cigarettes with the filter tips adjacent each other on a conveyor may have to be combined into a single row on another conveyor with all of the filters disposed on the same side of the single row. The single row may have the same or a different orientation than the two rows and will be disposed in a different plane.

Accordingly, an object of the present invention is to provide a rotatable device for transferring a row of aligned rod-like articles moving in a selected plane on a first conveyor to an aligned row in another plane on a different conveyor.

Another object of the present invention is to provide the rotatable device for selectively transferring only a portion of said rod-like articles.

And another object of the present invention is to provide the rotatable device for also reversing the positions of the rod-like articles being transferred and combining such articles into a row of similar articles transferred to the other conveyor by other means.

The foregoing and other objects and advantages will appear more fully hereinafter from a consideration of the detailed description which follows, taken together with the accompanying drawing wherein several embodiments of the invention are illustrated by way of example. It is to be expressly understood, however, that the drawing is for illustration purposes only and is not to be construed as defining the limits of the invention.

Figure 1:
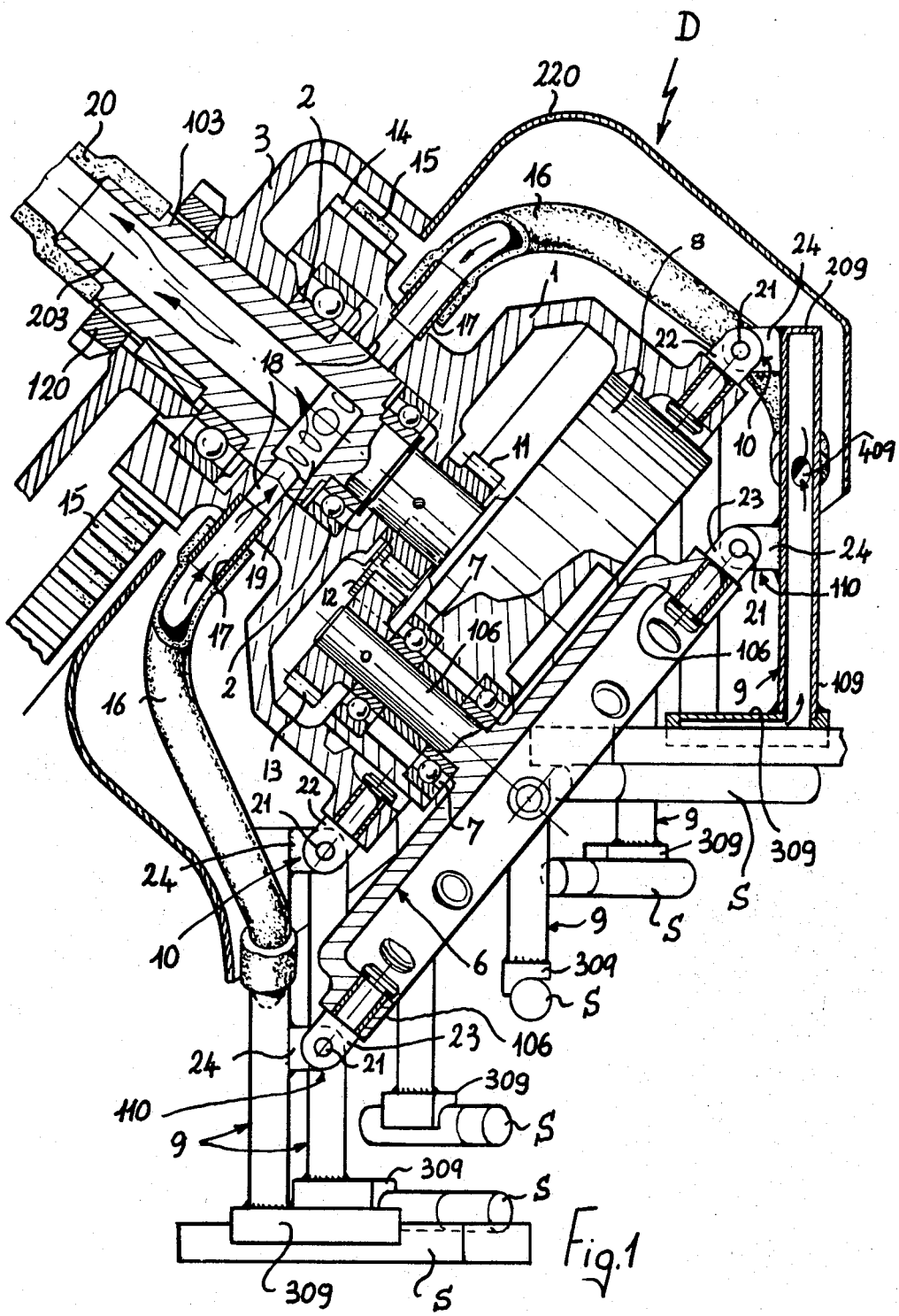
FIG. 1 is a sectional view of a rotatable device in accordance with the present invention.

Referring now to the drawings and particularly to FIG. 1, the novel device D is provided with a bell 1 which is rotatably mounted by bearings 2 on a hollow shaft 103 having a cavity 203 connected at one end by a duct 20 to a suitable source of vacuum. The bell 1 forms a planetary carrier rotatable on its central axis which is, in effect, the axis of rotation of the device D. A disk 8 which is flush mounted in and closes the aperture or mouth of the bell 1, forms an integral part thereof.

A planetary disk 6 is provided with a shaft 106 which extends thorugh and is rotatably supported on bearings 7 by the disk 8. A pinion or gear 13 is mounted on or keyed to the end of the shaft 106 opposite from the disk 6 and within the bell 1. Therefore, the disk 6, its shaft 106 and the pinion 13 are rotatable in unison on a common axis spaced from and parallel to the axis of the device D and revolvable around the axis of the device by rotation of the bell 1.

The end of the shaft 103 which extends into the bell 1 is closed and is provided with a pinion or gear 11 which meshes with an idler gear 12. The idler gear 12 also meshes with the pinion 13 according to a unitary drive ratio between the pinions 11 and 13 so that the speed of rotation of the disk 6 is equal to its speed of revolution around the axis of the device D. Therefore, the bell 1 and the disk 6 rotate concordantly on their respective axes. For rotation, bell 1 is provided with a pinion or gear 14 which meshes with a toothed belt or other suitable means 15 which is driven.

The hollow shaft 103, coaxial with the bell 1, is mounted on supporting structure 3 and is held immovable by a locking or fastening ring nut 120. The end of the cavity 203 adjacent the closed end of the shaft 103 is provided with a distribution chamber 19 which has circular sector profile forming an angular opening which is commensurate with a pre-set angle of operation of the device D. To adjust or properly position the pre-set angle of operation, the fastening ring nut 120 is backed off or loosened to permit the shaft 103 to be rotated on its axis. When the pre-set angle of operation is properly located, the nut 120 is tightened to lock the shaft 103 to the supporting structure 3.

A plurality of picking elements 9 are symmetrically articulated to the bell 1 and the planetary disk 6, each by means of hinges 10 and 110, respectively, the axes of which are parallel to each other. Each of the picking elements 9 consists of a hollow rod 109 which is closed at one end 209 and has fastened at its other end a picking shoe or cradle 309 in communication with the cavity of the rod and adapted to accomodate a rod-like element, such as a cigarette S, to be handled.

The cavity of each rod 109 has an opening 409 connected by a flexible conduit, such as a hose 16, to a union 17 flow connected to a radial opening 18 in the bell 1. The openings 18 are moved into and out of communication with the distribution chamber 19 by rotation of the bell 1 to appropriately provide vacuum to the picking elements 9.

The bell 1 and planetary disk 6 are substantially equal in diameter and are provided with angularly equispaced forks 22 and 23, respectively, equal in number to the number of picker elements 9 each of which are provided with a pair of spaced lugs or ears 24. Each of the forks 22 extends radially from the bell 1 and is rotatable on its own axis. A plurality of pins 21 pivotally connect the forks 22 and the upper lugs or ears 24 of the picker elements 9 to provide hinges 10. The forks 23, similar and corresponding in number to the forks 22, are connected by pivot pins 21 to the lower lugs 24 to form hinges 110.

A shield or cover 220 preferably is connected to the fixed structure which substantially encloses and protects the novel device D.

The novel device D operates as follows. With bell 1 urged to rotate in a pre-set direction through actuating or driving means 14 and 15, disk 6 revolves around the bell axis and rotates in the same direction and around its own axis with a period of rotation equal to that of revolution, by virtue of the gear coupling 11, 12 and 13 which determines this rotation. Consequently, the picker elements 9 with their hollow rods 109 are urged to have a closed-circuit movement of revolution with a component of traversing motion parallel to the longitudinal axes of such rods.

Since all the rods 109 are parallel to each other and regularly distributed, the said component of traversing motion will cause the rods to move on the surface of a quadric cylinder in the direction of the generatrixes of said cylinder, and a generic point of the axis of the rods describes on said cylinder a circumference lying in a plane perpendicular to the axis of revolution (bell axis) and having the center in the point of intersection of said axis with said plane, and said circumference corresponds, in projection, to an ellipse in a plane perpendicular to the common direction of hollow rods 109. Thus, cradles 309 accomplish periodic excursions in the direction of the axis of rods 109 and, at the same time, rotate around said axis at the speed of one complete revolution per each period of excursion.

The foregoing can be set forth in another way. The axes of the rods 109, which can be considered as the axes of the picker elements 9, are parallel to one another, and the parallel axes of the bell 1 and disk 6 are angularly offset from the axes of the picker elements. Thus, for each complete revolution of the bell 1 and disk 6 each picker element will complete an axial excursion while coursing a complete elliptical path.

The possibilities of utilization of the device according to the invention, for handling rows of neatly arranged articles having in common at least a geometrical feature which constitutes the parameter characterizing the arrangement of the row, and, for example, rodlike articles and, in particular, cigarettes, are numerous.

Figure 2:
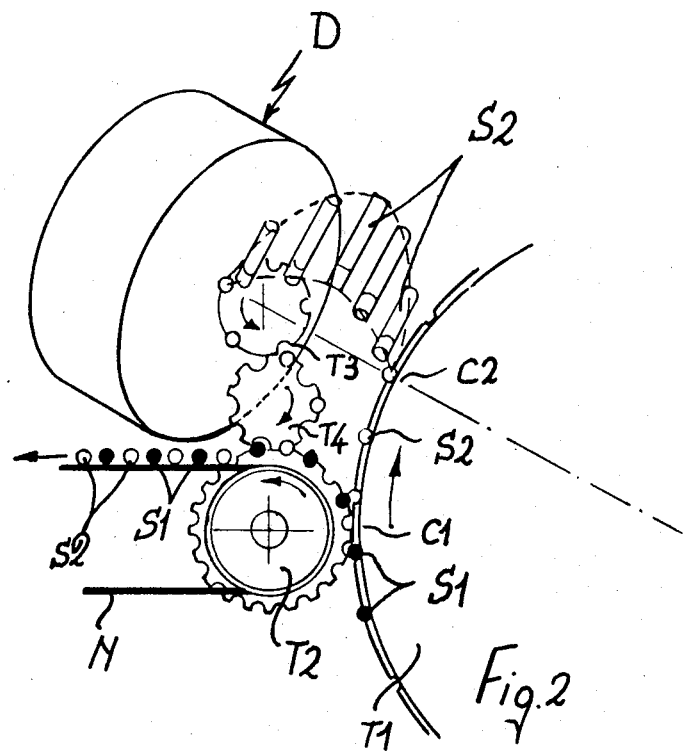
FIG. 2 is a schematic view of a rotatable device as shown in FIG. 1 adapted to transfer one of two rows of articles from one conveyor to another and simultaneously rotating such articles in a system wherein two rows of said articles with similar ends adjacent one another are combined into a single row with the same ends of said articles disposed along a common side of said single row.

Referring now to FIG. 2, the novel device D is schematically illustrated in an embodiment in which two rows S1 and S2 of filter tip cigarettes, axially aligned in pairs with the filters opposed headwise or adjacent each other, are aligned in a single row with all the filters disposed on the same side of the single row. the two rows S1 and S2 or pairs of cigarettes are accomodated in the flutes of a rotating drum or conveyor means T1. The flutes of a second or pickup drum T2 are aligned and coordinated or timed at the area indicated C1 so that alternate flutes pick up cigarettes from the row S1.

The novel device D is positioned to pick up cigarettes from row S2 from the flutes of drum T2 at a point C2. These cigarettes are overturned or rotated and delivered to a fluted drum T3 which involves half of one revolution of the bell 1 for each picker 9 during which time the picker is provided with vacuum. Accordingly, the vacuum chamber 203 must have a suitable angular opening which is properly adjusted as previously described by correct positioning of the shaft 103. The cigarettes of row S2 are transferred from the drum T3 to the unoccupied flutes of drum T2 by a fluted transfer drum T4. The cigarettes from rows S1 and S2 are fed from the alternate flutes of drum T2 to the conveyor N.

It should be understood that in a system with proper proportions and geometrical locations of the various system components, the novel device D could transfer cigarettes from drum T1 to drum T2 or conveyor N.

Figure 3:
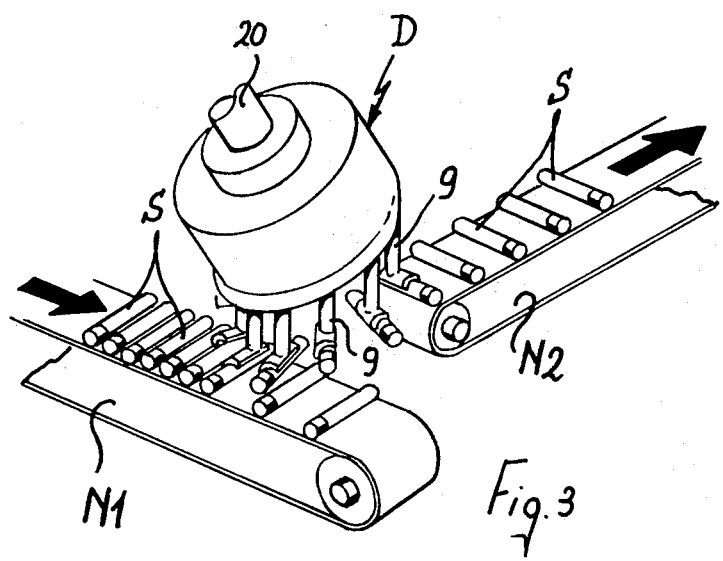
FIG. 3 is a schematic view of a rotatable device as shown in fig. 1 selectively transferring a portion of rod-like articles of a row moving in one direction to a row moving substantially at right angles to said one direction.

Referring now to FIG. 3, the novel device D is provided to transfer the direction of flow of cigarettes S from a fluted conveyor N1 to an analogous or or another fluted conveyor N2 which for simplicity are shown as belts without flutes. As shown, the transfer from conveyor N1 to conveyor N2 can be selective and, that is, only part of the articles of a row, and, for example, one article every two consecutive ones, can be transferred from one path to another. It is clear that the orthogonality of the path is only a specific case, and that, in general, the transfer is possible between two paths forming any angle between each other.

Although several embodiments of the invention have been illustrated and described in detail, it is to be expressly understood that the invention is not limited thereto. Various changes may be made in the design and arrangement of the parts without departing from the spirit and scope of the invention as the same will now be under-stood by those skilled in the art.

I claim:

1. A device for transferring rod-like articles from one conveyor to another, comprising
   a bell means having a central axis and being mounted for rotation on its axis,
   a disk means having an axis off-set from and parallel to the central axis of said bell means and being mounted on said bell means for rotation on its axis and revolving about the central axis of said bell means when said bell means rotates,
   a plurality of picker means each hinged to said bell and disk means each having a free end with means for receiving and releasably holding a rod-like article,
   said picker means having axes parallel to one another and being disposed equiangularly spaced around said bell and disk means,
   means for rotatably driving said bell means and gear means for causing said disk means to rotate on its axis when said bell means rotates, and
   means for selectively connecting said picker means to source of vacuum thereby providing means for holding rod-like article by each picker means during a preselected protion of a revolution of said bell means.

2. The device in accordance with claim 1, wherein said axes of said bell and disk means are angularly off-set from the parallel axes of said picker means such that each said picker means courses an elliptical path and makes an axial excursion during each revolution of said bell means.

3. The device in accordance with claim 2, and
   a fixed shaft having a vacuum chamber therein connected to a source of vacuum,
   said bell means rotatably mounted on said shaft,
   each of said picker means having a tubular rod extending along the axis thereof and a cradle at the free end thereof and flow connected therewith, and
   said means for selectively connecting said picker means to said source of vacuum providing flow connections from said tubular rods to said vacuum chamber.

4. The device in accordance with claim 3, and
said chamber having a profile of predetermined angular extent,
said bell means having a plurality of passages movable into and out of communication with said chamber profile, and
flexible conduit means singly connecting each of said tubular rods to a different one of said passages.

5. The device in accordance with claim 4, and said shaft being locked against movement and releasable to be rotated for angularly orienting the profile of said passage.

6. The device in accordance with claim 5, and said disk means including a shaft, and
said gear means comprising a pinion mounted on said fixed shaft, another pinion mounted on the shaft of said disk means and an idler gear in mesh with both pinions rotatably connected to said bell means.

* * * * *